United States Patent [19]

Szymborski et al.

[11] 4,328,290
[45] May 4, 1982

[54] BATTERY VENT PLUG

[75] Inventors: Joseph Szymborski, Bartlett; Frank D. Unetic, Elgin, both of Ill.

[73] Assignee: Gould Inc., Rolling Meadows, Ill.

[21] Appl. No.: 221,158

[22] Filed: Dec. 29, 1980

[51] Int. Cl.³ .......................................... H01M 2/12
[52] U.S. Cl. ................................... 429/54; 429/89
[58] Field of Search .......................... 429/78, 53–55, 429/89, 82

[56] References Cited

U.S. PATENT DOCUMENTS

| | | | |
|---|---|---|---|
| 2,114,659 | 12/1938 | Warren | 429/56 |
| 2,690,466 | 9/1954 | Kendall et al. | 429/53 |
| 2,690,467 | 9/1954 | Kendall | 429/53 |
| 2,934,584 | 4/1960 | Warren et al. | 429/54 |
| 3,096,216 | 7/1963 | Warren | 429/54 |
| 3,201,284 | 8/1965 | Ellis | 429/55 |
| 3,861,965 | 1/1975 | O'Sullivan | 429/53 |
| 4,078,121 | 3/1978 | Gratzmuller | 429/54 |
| 4,271,241 | 6/1981 | Hooke et al. | 429/54 |

Primary Examiner—Charles F. Lefevour
Attorney, Agent, or Firm—Augustus J. Hipp

[57] ABSTRACT

A battery vent plug providing repeated relief of a pressure condition within a battery at relatively low internal pressures. The vent plug is arranged to prevent dropping of the internal pressure to zero upon venting while yet having a small relief-reseal pressure range. The vent plug includes a relief valve within a housing defined by a rubber cylinder releasably engaging an annular seat on the housing about an inlet to a vent chamber within the housing. The rubber cylinder is maintained under a preselected compression assuring sealing thereof to the seat at pressures below a preselected venting pressure. Upon removal of the sealing portion of the cylinder from the seat, the pressurized gas escapes around the cylinder and through a hole in the housing to atmosphere.

9 Claims, 4 Drawing Figures

U.S. Patent
May 4, 1982
4,328,290
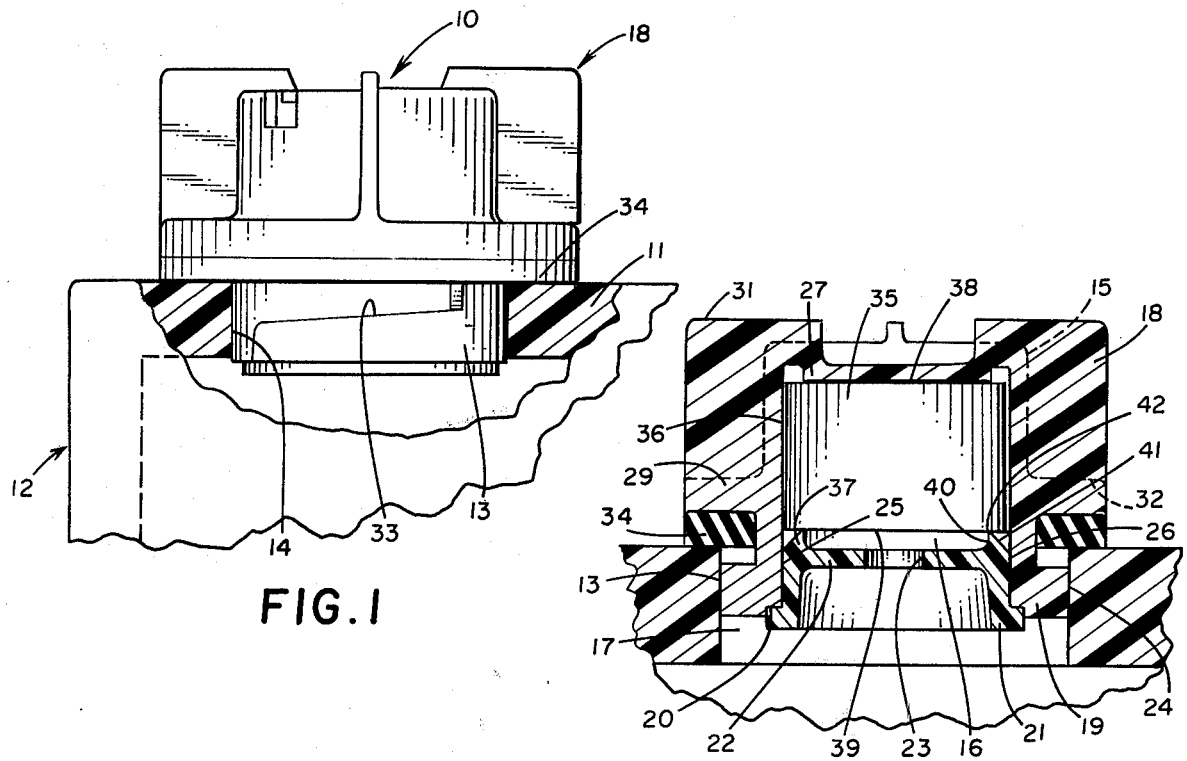
FIG. 1
FIG. 2
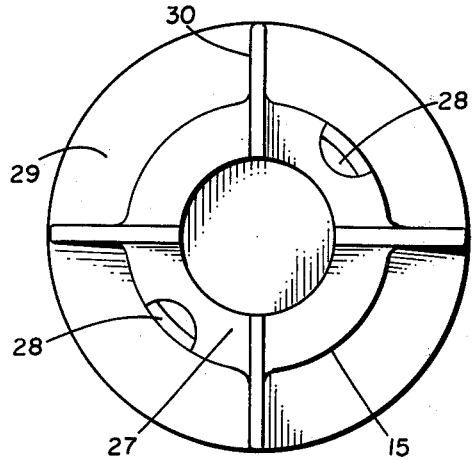
FIG. 3
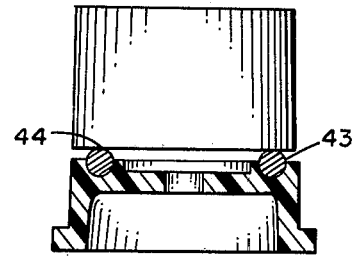
FIG. 4

BATTERY VENT PLUG

BACKGROUND OF THE INVENTION

1. Field of the Invention

This invention relates to battery vent plugs and in particular to battery vent plugs provided with low pressure relief valves.

2. Description of the Prior Art

In U.S. Pat. No. 3,201,284 of Grenville B. Ellis, a vent valve for batteries is shown having a pair of seal rings provided with abutting tapered annular portions which are deflected from their normal abutting association by pressure acting outwardly through a vent passage communicating with the interior of the battery. The rings are carried in an outwardly opening annular groove on the body of the plug so as to vent the battery to atmosphere through the resulting opening therebetween.

Robert A. Warren et al, in U.S. Pat. No. 2,934,584, show a control vent having a resilient sealing disc engaging the edge of a cup containing the battery cell elements, and means for clamping the disc against the cup edge. A gap is provided in the edge so that sealing pressure is exerted by the resilient strain of the less combined portions of the sealing disc adjacent the gap so that pressurized gas may lift the edge of the sealing disc at the gap and escape from the cup.

In U.S. Pat. No. 3,096,216, Robert A. Warren shows a vent valve adapted for venting an alkaline cell at gas pressures of 135 lbs. psi. The valve includes a sealing disc lying over a groove or notch, which is pushed slightly into the notch by the high pressure. By urging the sealing disc portion sufficiently into the notch, the seal with the sealing cup is momentarily broken to permit gas to escape.

Robert A. Warren discloses, in U.S. Pat. No. 3,114,659, a valve wherein a nylon gasket, a steel diaphragm, and a neoprene gasket are caused to bow outwardly by the pressure of the gas. When a certain predetermined pressure is reached, the seal between the sealing cup and the neoprene gasket is weakened sufficiently to permit venting therebetween. Upon reduction of the pressure, the steel diaphragm urges the structure back to the normal position, reestablishing the seal.

A common problem in the known battery pressure relief valve is the reduction of the pressure within the valve substantially to ambient or zero psig, as a result of each pressure relief operation. Thus, it is conventional in the known pressure relief valves to permit continuous bleeding until internal pressure in the battery reaches zero. A number of prior art vent devices which tend to maintain an internal pressure at all times have a relatively high relief pressure. One such structure is defined by a rubber disc with a narrow slit in the center thereof.

SUMMARY OF THE INVENTION

The present invention comprehends an improved low cost battery vent plug which provides low pressure relief of the battery cell chamber such as at pressures below 10 psig.

The vent plug of the present invention has a small relief-reseal pressure differential of approximately ±2 psig.

The vent plug of the present invention effectively maintains a positive pressure within the battery cell upon each venting operation.

The vent plug is formed of suitable materials unaffected by the corrosive materials in the battery.

The improved vent plug is defined by a housing having a mounting portion adapted to be mounted in a battery cover opening, a vent chamber, an annular seat confronting the vent chamber, an inlet opening through the seat to the vent chamber, and an outlet opening through a portion of the housing spaced from the inlet, a resilient body in the chamber having a sealing portion adjacent the inlet, and a force transfer portion opposite the sealing portion, and means on the housing for applying a compressive force to the force transfer portion directed through the body to urge the sealing portion against the seat for releasably sealingly closing the inlet, the resilient body being compressed toward the force transfer portion as a result of a preselected elevated fluid pressure in the inlet to space the sealing portion from the seat and permit flow of the fluid through the vent chamber about the resilient body to the outlet and to permit the resilient body to have the sealing portion resealed to the seat upon dropping of the fluid pressure below the preselected fluid pressure.

In the illustrated embodiment, the resilient body is defined by a right circularly cylindrical rubber member.

The resilient body, in the illustrated embodiment, defines parallel, opposite end surfaces defining the sealing portion and force transfer portion of the resilient body, respectively.

The vent chamber defines an annular space extending about the resilient body for providing communication between the inlet and outlet when the sealing portion is spaced from the seat.

The inlet opens to the vent chamber coaxially of the resilient body sealing portion in the illustrated embodiment.

In the illustrated embodiment, the seat comprises an upstanding annular projection on the housing defining an annular knife-edge portion engaged by the resilient body sealing portion.

In a modified form, the seat is defined by an O-ring carried by the housing.

A sealing gasket may be provided for sealing the housing mounting portion to the battery cover.

In the illustrated embodiment, the seat is defined by a projection having frustoconical radially inner and outer surfaces intersecting at a knife-edge engaged by the resilient sealing body.

The battery vent plug of the present invention is extremely simple and economical of construction while yet providing improved low pressure relief of a battery, such as lead-acid battery.

BRIEF DESCRIPTION OF THE DRAWING

Other features and advantages of the invention will be apparent from the following description taken in connection with the accompanying drawing wherein:

FIG. 1 is a fragmentary elevation of a battery having a vent plug embodying the invention;

FIG. 2 is an enlarged diametric section of the vent plug;

FIG. 3 is a top plan view thereof; and

FIG. 4 is a fragmentary diametric section of a modified form of vent plug embodying the invention.

DESCRIPTION OF THE PREFERRED EMBODIMENTS

In the exemplary embodiment of the invention as shown in FIGS. 1-3 of the drawing, a vent plug generally designated 10 is shown to be sealingly mounted to the top wall 11 of a battery 12 which illustratively may comprise a lead acid battery.

At times, such as at overcharge of the battery, gas is generated by electrolysis of water in the electrolyte. In hermetically sealed lead-acid batteries, the battery is effectively sealed so as to maintain an oxygen cycle therein such that oxygen gas generated at the positive electrode of the battery diffuses to the negative electrode thereof where it is electrochemically reduced to form water. Resultingly, buildup of hydrogen gas within the battery is minimized and water loss is thereby minimized.

However, it is desirable to provide in such sealed lead-acid batteries some means for venting the battery in the event of the internal pressure thereof exceeding a preselected elevated pressure. The present plug 10 provides such desirable pressure relief at relatively low operating pressures while yet effectively maintaining pressure within the battery.

The vent plug is provided with a mounting portion 13 which is fitted into an opening 14 in the battery cover, or top wall, 11. The body 15 of the vent plug defines a vent chamber 16. In the illustrated embodiment, a plug cap 17 cooperates with the body 15 and mounting portion 13 in defining the vent plug housing 18.

As best seen in FIG. 2, mounting portion 13 defines an outturned annular flange 19 provided with a radially inwardly opening annular recess 20 for receiving an outturned annular flange 21 at the inner end of the plug cap 17.

As further illustrated in FIG. 2, the plug cap 17 defines a transverse wall 22 outwardly of the flange portion 21 and has a central through opening 23 in direct communication with the cell interior and defines an inlet to the vent chamber 16. Transverse wall 22 and opening 23 may have any configuration desired as long as communication between the battery cell and vent chamber 16 is maintained.

Plug cap 17 defines an outer circularly cylindrical surface 24 which is secured to a complementary inner cylindrical surface 25 of mounting portion 13 of body 15 as by suitable adhesive 26, ultrasonic fusion, or the like. Thus, as indicated above, the plug cap is secured in association with body 15 to define the vent chamber 16.

As shown in FIG. 3, top wall 27 of body 15 is provided with a pair of diametrically oppositely positioned vent openings 28 defining outlets from the vent chamber 16.

Outwardly adjacent flange 19, body 15 is provided with an annular support flange 29. In one configuration, a plurality of thin vertical ribs 30 are spaced at 90° about the axis of body 15 and extend from an upper edge 31 spaced above top wall 27 to a lower edge 32 formed integral with the flange 29.

Mounting portion flange 19 defines upwardly facing inclined surface 33 cooperating with the battery cover wall 11 in defining a bayonet mount of the mounting portion to the cover. To provide a seal of the vent plug 10 to the cover, a rubber sealing gasket 34 is mounted to mounting portion 13 subjacent flange 29 so as to be compressed against the edge of the battery cover defining opening 14 when the vent plug is locked into position by the bayonet-type mount defined by flange surfaces 33 engaging the inside surface of the battery top wall.

Vent chamber 16 effectively defines a right circularly cylindrical chamber. Coaxially received in the vent chamber is a right circularly cylindrical resilient valve body illustratively formed of rubber, having a cross-sectional diameter slightly less than that of the vent chamber so as to define therebetween a coaxial annular vent space 36.

As shown in FIG. 2, the axial length of valve body 35 is preselected so as to cause the valve body to be compressed between top wall 27 of the housing body 15 and an annular upstanding seat 37 on the transverse wall 22 of plug cap 17. More specifically as shown in FIG. 2, the outer end of valve body 35 defines a planar surface 38 in facial engagement with top wall 27 and the inner end of the valve body 35 defines a planar surface 39 parallel to surface 38 and defining the sealing portion of the valve body engaging the seat 37.

In the embodiment of FIG. 2, seat 37 defines an annular knife edge formed by an inner frustoconical surface 40 and an outer frustoconical surface 41. The knife edge 42 provides an effectively positive seal to the valve body 35 in the normal disposition of vent plug 10, as illustrated in FIG. 2.

Vent plug 10 is arranged to vent gaseous fluids from the interior of the battery 12 when the pressure thereof reaches a preselected pressure. Internal battery fluid pressure acts through opening 23 in plug cap 17 against the surface 39 of valve body 35 so as to space surface 39 upwardly from the knife edge seat 42 at the preselected vent pressure. As will be obvious to those skilled in the art, the specific preselected pressure at which the vent plug 10 vents the gas from battery 12 is a function of the resiliency of the material making up valve body 35 and the amount of precompression applied to the valve body in urging the surface 39 against the knife edge seat. As will be further obvious to those skilled in the art, other parameters of the structure, including the diameter of the vent holes 28 and the radial dimension of the coaxial annular vent space 36 may be preselected in further controlling the pressure at which the vent plug operates.

Illustratively, in one form of vent plug 10 embodying the invention, the vent plug opened to relieve the battery internal pressure at a pressure of 8 psig, with a partial resealing of the valve body against the valve seat at a pressure of 6.5 psig, and with a positive stable resealing of the valve body to the valve seat when the pressure dropped to approximately 5 psig. Thus, illustratively, the vent plug may be arranged to provide a relatively small pressure differential in effecting the venting operation while maintaining a positive gas pressure within the battery at all times.

In the illustrated embodiment, the components of the vent plug, other than valve body 35 and sealing gasket 34, may be formed of a suitable molded synthetic resin resistant to corrosion by the battery acid. The valve body 35 and gasket 34 may be formed of suitable rubber material also resistant to attack by the battery acid.

As will be further obvious to those skilled in the art, other forms of seats may be utilized within the scope of the invention. Thus, as shown in FIG. 4, an O-ring 43 may be installed in a suitable annular recess 44 in the transverse wall of the plug cap in lieu of the knife edge seat illustrated in FIG. 2. Where the O-ring is formed of rubber, the rubber material may be preselected to resist corrosion by the battery acid.

Thus, the present invention comprehends an improved vent plug structure which is adapted to provide venting of a sealed storage battery over a small pressure differential range. The vent plug further is arranged to effect such venting while maintaining a positive pressure within the battery. The invention comprehends control of the parameters of the construction of the components of the vent plug so as to provide such venting at a preselected pressure, such as in the range of approximately 1 psig to 20 or more psig.

It is contemplated that the vent plug housing may have any shape or configuration desired so long as the plug cap cooperates with the housing and valve body to form the desired fluid seal and to provide a fluid passage which, upon excess pressure buildup within the cell, permits the valve body to unseat to vent the excess pressure to the atmosphere as described. Likewise, the vent opening or openings in the housing may be positioned in any convenient location so long as fluid communication is maintained with the atmosphere upon the valve body venting the excess pressure. Further, it may be desirable to design the plug cap to facilitate drainage of liquid electrolyte back into the cell from the vent chamber or to reduce the chances of electrolyte entering the vent chamber. Thus, it is contemplated that the vent plug embodying this invention may take many shapes and other features may be included as desired without departing from the spirit and scope of the invention as defined in the appended claims.

The foregoing disclosure of specific embodiments is illustrative of the broad inventive concepts comprehended by the invention.

We claim:

1. A battery vent plug comprising:
   a housing having a mounting portion adapted to be mounted in a battery cover opening, a vent chamber, an annular seat confronting said vent chamber, an inlet opening through said seat to said vent chamber, and an outlet opening through a portion of said housing spaced from said inlet;
   a resilient body in said chamber having a sealing portion adjacent said inlet, a force transfer portion opposite said sealing portion adjacent said outlet, and defining a sidewall therebetween; and
   means on said housing for applying a compressive force to said force transfer portion directed through said body to urge said sealing portion against said seat for compressing said body and releasably sealingly closing said inlet, the compression of the body being preselected to provide a preselected sealing force while causing radial expansion of said sidewall to be spaced closely inwardly of the vent chamber wall, said resilient body being further compressed toward said force transfer portion as a result of an elevated fluid pressure in said inlet sufficient to overcome said compressive sealing force and space said sealing portion from said seat and permit flow of the fluid through said vent chamber about the length of said resilient body through the space between said sidewall and the vent chamber wall to said outlet, and to permit said resilient body to have said sealing portion resealed to said seat upon dropping of the fluid pressure to below said preselected fluid pressure.

2. The battery vent plug of claim 1 wherein said resilient body comprises a right circularly cylindrical body.

3. The battery vent plug of claim 1 wherein said resilient body comprises a right circularly cylindrical body having parallel planar ends defining the outer surfaces of said sealing portion and force transfer portion respectively.

4. The battery vent plug of claim 1 wherein said vent chamber defines an annular space about said resilient body providing communication between said inlet and outlet when said sealing portion is spaced from said seat.

5. The battery vent plug of claim 1 wherein said resilient body comprises a right circularly cylindrical body, said inlet opening to said vent chamber coaxially of said resilient body sealing portion.

6. The battery vent plug of claim 1 wherein said seat comprises an upstanding annular projection on said housing defining an annular knife edge portion engaged by said resilient body sealing portion.

7. The battery vent plug of claim 1 wherein said seat comprises an O-ring carried by said housing to be engaged by said resilient body sealing portion.

8. The battery vent plug of claim 1 further including a sealing gasket for sealing said housing mounting portion to a battery cover.

9. The battery vent plug of claim 1 wherein said seat comprises an upstanding annular projection on said housing defining an annular knife edge portion engaged by said resilient body sealing portion, said projection being defined by frustoconical radially inner and outer surfaces.

* * * * *